(12) United States Patent
Grabau

(10) Patent No.: US 7,976,955 B2
(45) Date of Patent: *Jul. 12, 2011

(54) VULCANIZED RUBBER COMPOSITION AND ARTICLES MANUFACTURED THEREFROM

(75) Inventor: Ted Dennis Grabau, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 779 days.

This patent is subject to a terminal disclaimer.

(21) Appl. No.: 11/927,295

(22) Filed: Oct. 29, 2007

(65) Prior Publication Data

US 2008/0048145 A1 Feb. 28, 2008

Related U.S. Application Data

(63) Continuation of application No. 10/712,549, filed on Nov. 13, 2003, now Pat. No. 7,288,323.

(51) Int. Cl.
| | |
|---|---|
| B32B 15/08 | (2006.01) |
| B32B 25/16 | (2006.01) |
| B32B 27/22 | (2006.01) |
| F01B 19/00 | (2006.01) |
| C08L 33/00 | (2006.01) |

(52) U.S. Cl. ........ 428/462; 428/457; 428/461; 428/483; 428/476.3; 428/463; 428/520; 92/48; 92/49; 524/565; 524/566; 524/571; 524/492

(58) Field of Classification Search .................. 251/337, 251/354, 358; 428/355 R, 355 AC, 355 EN, 428/462; 92/48

See application file for complete search history.

(56) References Cited

U.S. PATENT DOCUMENTS

| | | | | |
|---|---|---|---|---|
| 3,192,836 | A | * | 7/1965 | Schwartzwalder ......... 92/103 R |
| 3,644,590 | A | | 2/1972 | Coulthard |
| 3,834,231 | A | * | 9/1974 | Hisada ............................ 73/279 |
| 4,386,181 | A | | 5/1983 | Kotani et al. |
| 4,412,103 | A | | 10/1983 | Fujii et al. |
| 4,448,939 | A | * | 5/1984 | Fasolka et al. ................ 525/474 |
| 4,488,341 | A | * | 12/1984 | Scott et al. .................. 29/890.09 |

(Continued)

FOREIGN PATENT DOCUMENTS

EP    0 972 799 A1    1/2000

(Continued)

OTHER PUBLICATIONS

D6 XP-002316359 Japanese Journal—Synthetic Elastomers and Natural Rubber, STN CA Caesar accession No. 1039, entered Dec. 25, 1993 for Evaluation of Elongation and Hardness of Acrylonitrile-Butadiene Rubber, Fundam. Techno. Res. Lab., Tokyo Gas Co., Ltd., Tokyo, Japan (1 page).

(Continued)

Primary Examiner — Rip A. Lee
(74) Attorney, Agent, or Firm — Marshall, Gerstein & Borun LLP

(57) ABSTRACT

The rubber compositions described herein have been found to have an exceptionally long life as a spring-biased actuator diaphragm material that maintains its position compressed, e.g., bolted, between opposed flanges, while maintaining excellent compressibility, low temperature flexibility, hydrocarbon resistance, abrasion resistance and mechanical strength. The compositions include a copolymer rubber component; a plasticizer for the copolymer rubber; a vulcanizing agent for the copolymer rubber; a silica filler; and a coupling agent, such as a silane coupling agent, capable of coupling the silica filler to the copolymer rubber.

23 Claims, 2 Drawing Sheets

U.S. PATENT DOCUMENTS

Figure 1:
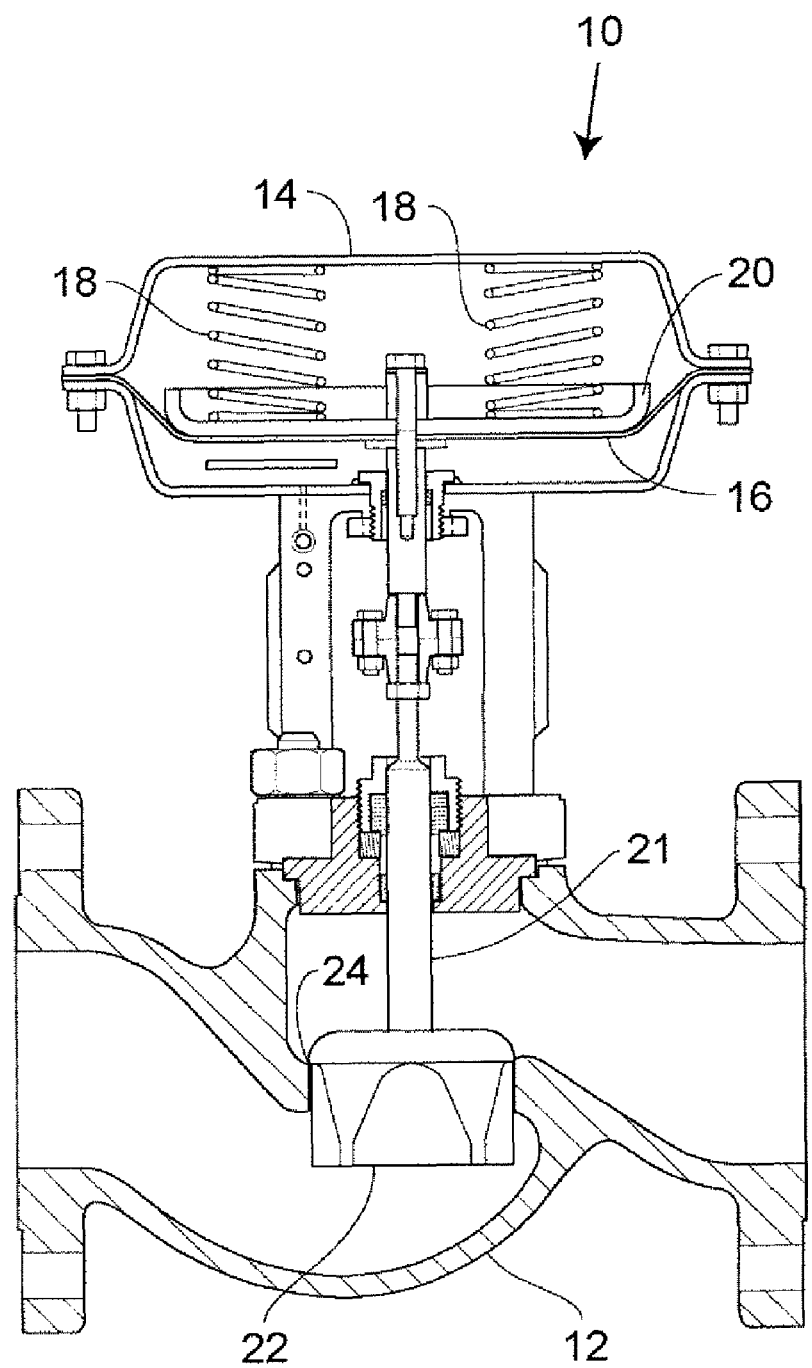

| | | | |
|---|---|---|---|
| 4,491,621 A | | 1/1985 | Okumoto et al. |
| 4,524,176 A | * | 6/1985 | Pike et al. ............... 525/12 |
| 4,828,923 A | | 5/1989 | Nakagawa et al. |
| 4,897,440 A | | 1/1990 | Lo |
| 5,026,583 A | | 6/1991 | Nakagawa et al. |
| 5,047,287 A | | 9/1991 | Horiuchi et al. |
| 5,206,293 A | | 4/1993 | Sakai et al. |
| 5,321,073 A | | 6/1994 | Kondo et al. |
| 5,376,730 A | | 12/1994 | Niwano et al. |
| 5,502,095 A | | 3/1996 | Ueshima et al. |
| 5,550,190 A | | 8/1996 | Hasegawa et al. |
| 5,578,800 A | | 11/1996 | Kijima |
| 5,727,529 A | * | 3/1998 | Tuckey ............... 123/514 |
| 5,783,625 A | * | 7/1998 | Mori et al. ............. 524/509 |
| 5,855,976 A | | 1/1999 | Oyama et al. |
| 5,942,577 A | | 8/1999 | Venkataswamy |
| 6,003,876 A | * | 12/1999 | Yamagishi et al. ........... 277/407 |
| 6,103,803 A | | 8/2000 | Cheung et al. |
| 6,335,391 B1 | * | 1/2002 | Matsumoto et al. .......... 524/236 |
| 6,451,915 B1 | | 9/2002 | Ellul et al. |
| 2002/0128390 A1 | | 9/2002 | Ellul et al. |
| 2003/0083412 A1 | | 5/2003 | Luginsland et al. |
| 2003/0125454 A1 | | 7/2003 | Ellul et al. |
| 2003/0127803 A1 | | 7/2003 | Yokoyama et al. |
| 2003/0187113 A1 | | 10/2003 | Shiho et al. |
| 2003/0191247 A1 | | 10/2003 | Kawasaki et al. |

FOREIGN PATENT DOCUMENTS

| | | |
|---|---|---|
| EP | 1 270 658 A1 | 1/2003 |
| JP | 51105374 A2 | 9/1976 |
| JP | 63256680 A | 10/1988 |
| JP | 07186287 A | 7/1995 |
| JP | 08145221 A | 6/1996 |
| JP | 09316238 A | 12/1997 |
| JP | 11080421 A | 3/1999 |
| JP | 2003033202 A | 2/2003 |
| JP | 2003314700 A | 11/2003 |
| JP | 2004352922 A | 12/2004 |
| JP | 2009235304 A | 10/2009 |

OTHER PUBLICATIONS

D7 XP-002316360 Russian Journal—Elastomers, Including Natural Rubber, STN CA Caesar accession No. 1040, entered STN: May 12, 1984 for Adhesion of Unimpregnated Polyamide Fabrics to Vulcanizate Butadiene-Nitrile Ruber, M. Z. Rakhman; L. B. Malkina; and M.V. Vakorina (1 page).

PCT International Search Report dated Feb. 14, 2005 by the European Patent Office (Netherlands) for International Application No. PCT/US2004/034582 (3 pages).

* cited by examiner

VULCANIZED RUBBER COMPOSITION AND ARTICLES MANUFACTURED THEREFROM

CROSS-REFERENCE TO RELATED APPLICATION

This application is a continuation of application Ser. No. 10/712,549 filed Nov. 13, 2003, now U.S. Pat. No. 7,288,323. The entire text of the priority application is incorporated herein by reference in its entirety.

TECHNICAL FIELD

Described herein is a vulcanized rubber composition that has excellent properties of hardness, low temperature flexibility, abrasion resistance, tensile strength, compressive strength, and hydrocarbon resistance while maintaining a relatively high coefficient of friction such that it will maintain its position between opposed flanges, under repeated tensioning, while compressed therebetween. In the preferred embodiment, the rubber composition is compounded, shaped and then vulcanized for use as a spring-biased actuator diaphragm in a fluid control valve to control the flow of liquids and/or gases, e.g., in a natural gas pipeline, such as disclosed in this assignee's patent application Ser. No. 10/360,292 filed Feb. 7, 2003, hereby incorporated by reference.

BACKGROUND

Actuator valves used to control fluid flow are well known in the art and include an actuator housing containing an actuator diaphragm that is spring biased against a metal plate, and movable in opposite directions within the actuator housing in response to supplied air pressure. The actuator diaphragm typically operates a fluid flow valve by being structurally interconnected to a valve stem that is operatively connected to a valve seat disposed within the fluid flow passageway, to open and close the valve. The actuator diaphragm is properly positioned within the actuator housing by bolting the diaphragm between opposed flanges so that the actuator diaphragm forms a fluid-impermeable barrier completely across the interior of the actuator housing. In this manner, air pressure exerted on one face of the actuator diaphragm causes the actuator diaphragm to move within the actuator housing against a spring biasing force, thereby causing movement of the valve stem which raises a valve plug away from a valve seat for opening of the fluid control valve. The diaphragm typically is normally spring biased in a position to seal the valve plug against the valve seat to maintain the valve in a closed position absent pneumatic pressure against the diaphragm.

One of the major problems experienced with known spring-biased actuator diaphragms is the inability, over long periods of time, to retain the actuator diaphragm bolted between the opposed flanges of the actuator housing. Actuator diaphragm flange retention is a balance of flange geometry, diaphragm material properties, unsupported diaphragm area, pressure differential and bolting stress. Failure to retain the actuator diaphragm between the actuator housing flanges results in a loss of pneumatic pressure and loss of control over the opening and closing of the valve. Actuator diaphragm material must be sufficiently hard so that it can be properly stressed (compressed) between the opposed flanges of the actuator housing, without fracture, tearing or other physical damage such that it can be retained, sandwiched and compressed between opposed flanges when flexed repeatedly during valve operation; yet the diaphragm material must be soft and flexible at relatively low temperatures, e.g., as low as $-40°$ C., to withstand constant flexing over a long period of time without physical damage. Lower hardness rubber supports less compressive stress than harder rubber and, therefore, flange retention is diminished. The material tested in the data presented herein has a Shore durometer A of about 85, and increased compression set resistance, while maintaining sufficient flexibility at a temperature of $-40°$ C. Typical prior art spring-biased actuator diaphragms have a Shore durometer A of about 60. Additionally, a spring-biased actuator diaphragm is in constant frictional contact with valve stem connecting structure, typically a metal plate, disposed within the actuator housing and, therefore, needs sufficient abrasion resistance and tear resistance to maintain a very long useful life.

It has been found that the rubber compositions described herein have excellent hardness, tensile strength, compressive strength, tear resistance, abrasion resistance, hydrocarbon resistance, high temperature resistance, non-brittleness and flexibility at low temperatures, e.g., $-40°$ C., and provide better frictional engagement when compressed between opposed structure, e.g., flanges, to maintain an unexpectedly long life for use as a spring-biased actuator diaphragm of a fluid control valve.

SUMMARY

The rubber compositions described herein are useful in any environment in which a rubber composition, in sheet form, with or without a reinforcing fabric, requires hydrocarbon resistance, low temperature flexibility, excellent tensile strength and tear resistance, fluid-impermeability, abrasion resistance, and an excellent balance between mechanical strength and low temperature flexibility. The rubber compositions described herein have excellent hardness, flexibility, tensile strength, tensile elongation, compression set, thermal-aging resistance, and hydrocarbon resistance while being capable of maintaining frictional engagement when compressed within a retaining structure, e.g., compressed between opposed flanges of a spring-biased actuator housing. The composition also is useful for automobile parts, such as joint boots; electrical parts; McPherson strut boots; tow-link boots; ball joint seals; tie rod seals; universal joint seals; bellows for air suspensions; rolling diaphragms; propeller shaft boots; O-rings; gaskets; waterproof fabrics; tubes; hoses, such as power steering hoses and garden hoses; vacuum tubes; coil tubes; conveyor belts; golf club grips; shoe soles; and automotive bumpers. The preferred use for the composition is, in sheet form, as a spring-biased actuator diaphragm, preferably reinforced with a suitable fabric, such as a woven nylon.

Accordingly, one aspect of the rubber compositions described herein is to provide a rubber composition that has balanced properties of hardness, compressibility, and low temperature flexibility.

Another aspect of the rubber compositions described herein is to provide vulcanized sheet rubber articles that have sufficient hardness and compressibility to retain their position while being compressed between opposed flanges, while maintaining sufficient flexibility, particularly at low temperatures, e.g., $-40°$ C., to maintain an unexpectedly long useful life when repeatedly flexed and stretched, without being pulled out from between the flanges.

Another aspect of the rubber compositions and rubber articles described herein is to provide a rubber composition capable of being vulcanized, in sheet form, by itself or while in contact with a reinforcing material, such as a centrally disposed fabric layer sandwiched between a pair of rubber composition layers, to form a long life diaphragm particularly useful as a spring-biased actuator diaphragm for a fluid-control valve.

Still another aspect of the rubber compositions and rubber articles described herein is to provide a rubber composition containing a silica filler together with a coupling agent capable of coupling the silica filler to the copolymer rubber for better abrasion resistance of the rubber coated diaphragm when in dynamic contact with the metal diaphragm plate and any other metal components of the actuator.

Another aspect of the rubber compositions and rubber articles described herein is to provide the composition with a suitable plasticizer in an amount capable of bonding with a resin in a flange coating composition when compressed between opposed resin-coated flanges.

Figure 2:
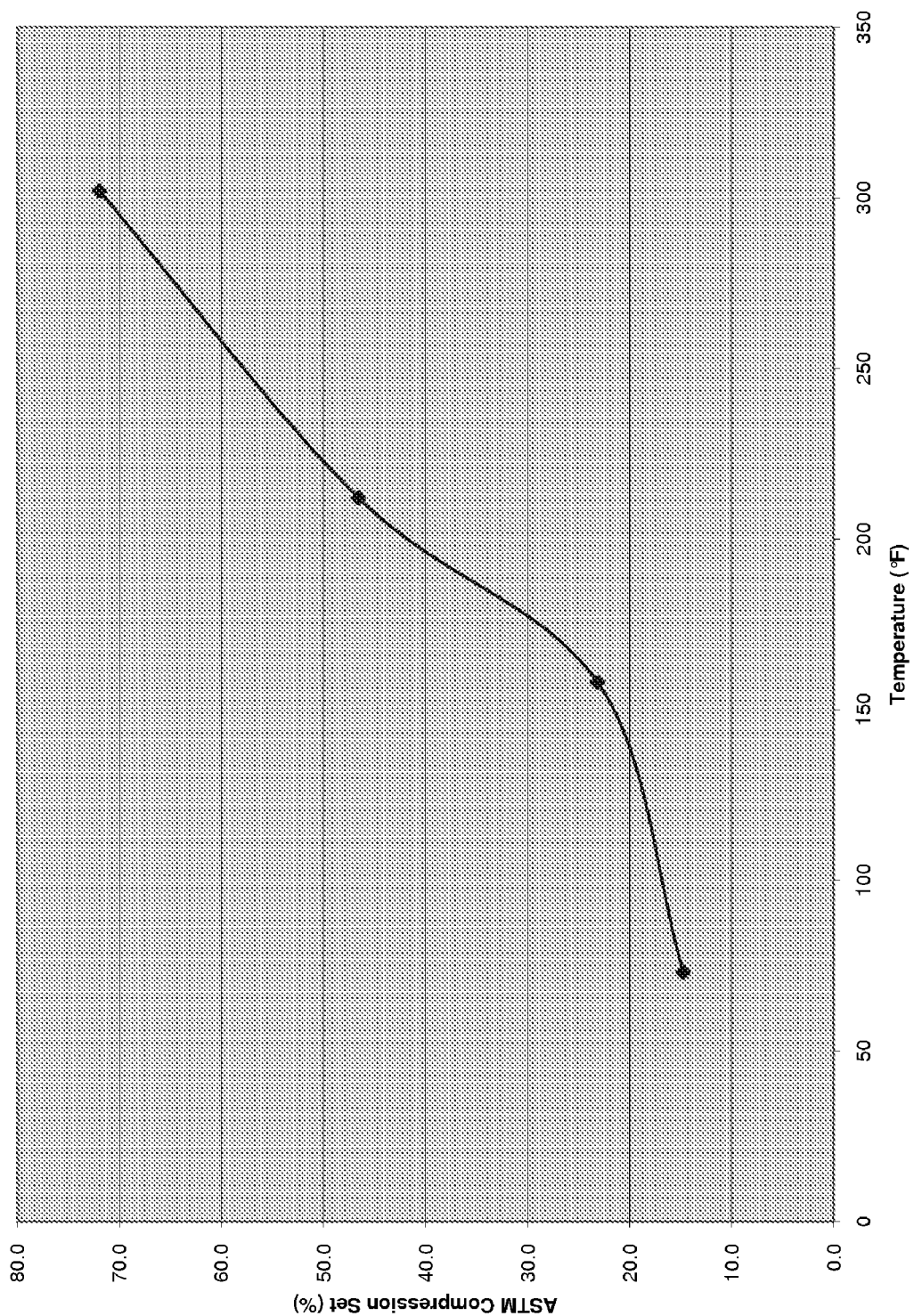

The above and other aspects and advantages of the rubber compositions, rubber articles and reinforced rubber articles described herein will become more apparent from the following detailed description taken in conjunction with the drawings in which:

FIG. 1 is a sectional elevational view illustrating a fluid control valve that operates via an actuator, including an actuator housing containing a spring-biased actuator diaphragm comprising the rubber compositions described herein; and FIG. 2 is a graph of temperature vs. compression (%) plotting data presented in Table I.

DETAILED DESCRIPTION

The rubber compositions described herein have been found to have an exceptionally long life as a spring-biased actuator diaphragm material that maintains its position compressed, e.g., bolted, between opposed flanges, while maintaining excellent compressibility, low temperature flexibility, hydrocarbon resistance, abrasion resistance and mechanical strength. The compositions include a copolymer rubber component; a plasticizer for the copolymer rubber; a vulcanizing agent for the copolymer rubber; a silica filler; and, in a preferred embodiment, a coupling agent, such as a silane coupling agent, capable of coupling the silica filler to the copolymer rubber.

Ranges may be expressed herein as from "about" or "approximately" on particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The preferred copolymer rubber is prepared by copolymerizing an unsaturated nitrile such as acrylonitrile and/or methyl acrylonitrile with a conjugated diene, such as 1,3-butadiene, isoprene, and/or 1,3-pentadiene. The most preferred copolymer rubber should have about 10% to about 45% by weight of the unsaturated nitrile, preferably acrylonitrile, about 55% to about 90% by weight of the conjugated diene, preferably 1,3-butadiene, to maintain the proper balance between hardness and flexibility. Suitable uncured rubbers containing the proper balance of unsaturated nitrile and conjugated diene may be obtained from Bayer Corporation under the Trademark PERBUNAN®, having a Mooney viscosity (ASTM D 1646) of 40-50. The preferred copolymer has a molecular weight in the range of about 50,000 to about 1,000,000, preferably PERBUNAN® 2845 C from Bayer Corporation. Additional examples of copolymer rubbers useful for the purposes described herein include acrylonitrile-butadiene copolymer rubber, acrylonitrile-isoprene copolymer rubber, acrylonitrile-butadiene-isoprene copolymer rubber, acrylonitrile-butadiene-methyl acrylate copolymer rubber, and acrylonitrile-butadiene-butyl acrylate copolymer rubber. Most suitable among them is acrylonitrile-butadiene copolymer rubber.

In order to maintain a proper cross-link density of this copolymer rubber or to maintain the proper balance between hardness and low temperature flexibility, the copolymer rubber is cured with a suitable vulcanizing agent in an amount of about 0.01 to about 10 parts-by-weight, preferably from about 1 to about 3 parts-per-weight vulcanizing agent per 100 parts-by-weight of the copolymer rubber. Any vulcanizing agent capable of vulcanizing the copolymer rubber is useful. Examples of suitable vulcanizing agents include sulfur; sulfur chloride; sulfur dioxide; oximes such as p-quinonedioxime; carbamates such as hexyadiamine carbamate; and/or ethylene-diamine carbamate; selenium litharge; organic peroxides; or the like. The preferred vulcanizing agent is sulfur. Suitable organic peroxide cross-linking (vulcanizing) agents include dicumyl peroxide; di-t-butyl peroxide; t-butyl cumyl peroxide; benzoyl peroxide; 2,4-dichlorodibenzoyl peroxide; 2,5-dimethyl-2,5-di(t-butylperoxy)hexyne-3; 1,1-di-(t-butylperoxy)-3,3,5-trimethylcyclohexane; t-butylperoxybenzoate; 2,5-dimethyl-2,5-di(benzoylperoxy)hexane; and 1,3-di(t-butylperoxyisopropyl)benzene.

The composition also should include a suitable plasticizer in an amount of about 1 to about 30 parts by weight per 100 parts by weight of copolymer rubber, preferably about 5 to about 20 parts by weight plasticizer per 100 parts by weight of copolymer rubber and, most preferably, about 10 parts by weight plasticizer per 100 parts by weight of copolymer rubber. Suitable plasticizers include mineral oil type rubber softeners called processing oils or extending oils; phthalic acid esters, such as dioctyl phthalate, dibutyl phthalate, diethyl phthalate, butyl benzyl phthalate, di-2-ethylhexyl phthalate, diisodecyl phthalate, diundecyl phthalate, diisononyl phthalate, and the like; phosphoric acid esters, such as tricresyl phosphate, triethyl phosphate, tributyl phosphate, tri-2-ethylhexyl phosphate, trimethyl phosphate, tributoxyethyl phosphate, tris-chloroethyl phosphate, tris-dichloropropyl phosphate, condensed phosphate, triphenyl phosphate, trixylenyl phosphate, cresyl diphenyl phosphate, xylenyl diphenyl phosphate, 2-ethylhexyl diphenyl phosphate, trilauryl phosphate, tricetyl phosphate, tristearyl phosphate, trioleyl phosphate, and the like; trimellitic acid esters, such as octyl trimellitate, isononyl trimellitate, isodecyl trimellitate, and the like; dipentaerythritol esters; fatty acid esters such as dioctyl adipates, dimethyl adipates, di-2-ethylhexyl adipates, diisobutyl adipate, dibutyl adipates, diisodecyl adipates, dibutyl diglycol adipates, di-2-ethylhexyl azelate, dioctyl azelate, dioctyl sebacate, di-2-ethylhexyl sebacate, methyl acetylricinoleate, and the like; pyromellitic acid esters, such as octyl pyromellitate and the like; epoxidized plasticizers such as epoxidized soybean oil, epoxidized linseed oil, epoxidized alkyl alcohol-fatty acid ester (e.g., epoxidized octyl alcohol-fatty acid ester) and the like; polyether plasticizers such as adipic acid ether esters, polyether esters, polyethers and the like. These plasticizers can be used alone or in combination of two or more. The fatty acid esters and fatty acid ethers are preferred, particularly the fatty acid esters, such as PLASTHALL® 226, from The C. P. Hall Company, which is dibutoxyethoxyethyl adipate (DBEEA).

In accordance with one important embodiment of the rubber compositions and rubber articles described herein, the rubber composition should include a filler, preferably a silica filler, and more preferably a combination of a silica filler with another filler, such as carbon black. In this embodiment, the silica filler should be included in the copolymer rubber composition in an amount of about 10 to about 80 parts by weight silica filler per 100 parts by weight of copolymer rubber, preferably 20 to 60 parts by weight silica filler per hundred parts by weight of copolymer rubber, to provide sufficient cycle life (wear and abrasion resistance) over long periods of time while maintaining a sufficiently low storage modulus onset, e.g., −51° C. to −20° C., preferably −45° C. to −35° C. It has been found that the inclusion of the silica filler(s) described herein provide exceptional abrasion resistance to the rubber composition. In addition to silica, to achieve the full advantage of the rubber compositions for use as a diaphragm material, another filler, preferably carbon black, should be included in the composition for maintaining mechanical and structural properties, particularly when sandwiched, and retained between opposed flanges. Suitable additional fillers, besides carbon black, include talc, calcium carbonate, alumina tri-hydrate, asbestos, pumice powder, glass fibers, mica, wood flour, and the like. The total amount of the combined fillers should be in the range of about 40 to 200 parts by weight per 100 parts by weight of the copolymer rubber. Preferred proportions of silica filler and the additional filler(s) are in the range of about 1 to about 3 parts by weight silica filler to about 2 to about 4 parts by weight additional filler(s). It is preferred to include less silica filler than additional filler when an additional filler is included in the composition, preferably about 2 to less than 3 parts by weight silica filler for every 3 to 4 parts by weight additional filler.

To achieve the full advantage of the silica filler embodiment of the rubber compositions described herein, the silica filler should be a fumed silica or a precipitated silica having a particle size in the range of about 5 to about 300 microns. In accordance this embodiment, at least 90% of the silica particles should have a particle size less than about 200 microns. The preferred silica filler material is a precipitated silica, obtained from Degussa A.G. Corporation as ULTRASIL® VN3 SP.

In accordance with another important embodiment of the rubber compositions and articles described herein, it has been found that flanges, or other structure contacting and compressing the rubber articles, when coated with a paint composition containing a suitable resin, provides better frictional and bonding adherence to the rubber articles. Surprisingly, bonding is achieved when the rubber articles described herein are sufficiently compressed against the paint composition to provide intimate contact between the resin in the paint composition and the plasticizer contained in the rubber articles. Suitable resins capable of bonding to the above-mentioned plasticizers include polyesters, such as polybutylene terephthalate (PBT), or polyethylene terephthalate; polyurethanes; polyethers; alkyd resins; acrylic polymers and copolymers; latex polymers and copolymers; epoxy resins and the like. Compressive forces on the order of 1.3 MPa to 15 MPa enable the coated resin to mechanically and/or chemically bond to the plasticizer in the rubber article, so long as the rubber article contains the plasticizer in an amount of at least about 1 part by weight up to about 30 parts by weight, preferably about 3 to about 20 parts by weight plasticizer per hundred parts by weight copolymer rubber.

To achieve the full advantage of the rubber compositions described herein, the plasticizer should be chosen so that it has some solubility in the resin contained in the paint (coating) composition for bonding the rubber composition to the contacted coating on the flange surfaces. More particularly, the plasticizer contained in the rubber composition should solubilized in the resin at least about 0.1 gram of plasticizer per hundred grams of coating resin, preferably at least about 0.5 grams plasticizer per hundred grams of coating resin, and more preferably a plasticizer solubility of at least 1-5 grams of plasticizer per hundred grams of coating resin. This additional bonding provides additional and unexpected retention of the rubber article, particularly when used as a spring biased actuator diaphragm, between compressed flanges or other retaining structure that compresses the rubber article to retain its position.

In accordance with still another embodiment of the rubber compositions described herein, a coupling agent, such as a silane coupling agent is applied to filler materials, such as the preferred silica filler, before it is incorporated into the rubber or added to the rubber composition, in an amount of about 0.1 to about 20, preferably about 2 to about 10, parts by weight per hundred parts by weight of the filler. The coupling agent bonds the silica filler to the copolymer rubber to achieve unexpectedly increased mechanical strength, tear strength and abrasion resistance in the rubber composition for increased cycle life and better flange retention of the rubber composition when formed into a diaphragm. This increased strength is particularly evident when the rubber composition is vulcanized in sheet form and positioned between opposed flanges as a spring-biased actuator diaphragm to achieve an unexpectedly increased useful cycle life and flange retention by virtue of its increased compression strength.

Useful coupling agents, or filler activators include those selected from the group consisting of silanes, titanates, aluminates, zirconates, and mixtures thereof; particularly the organosilanes, such as tris(methoxy-ethoxy)vinyl silane or mercaptosilane, organotitanates, organoaluminates and/or organozirconates. The concentration of coupling agent should be at least about 0.1%, preferably in the range of about 0.1% to about 20% by weight, more preferably in the range of about 0.5% to about 6% by weight, and most preferably about 1% to about 4% by weight, based on the weight of the copolymer rubber. The preferred coupling agents have a structure as follows:

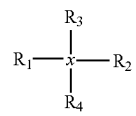

wherein x=Si, Ti, Zr or Al
wherein $R_1$ is an organic radical, preferably an alkyl radical or an amine radical, bonded directly to the Si, Ti, Zr or Al atom (x) and at least one of $R_2$, $R_3$ and $R_4$ is a radical containing a functionality, preferably an organic functionality, capable of a condensation reaction with a hydrogen from the —OH groups of the silica, preferably selected from H, halogen, alkoxy, acyloxy and amine; and at least another one of $R_2$, $R_3$ and $R_4$ is capable of reaction at a double bond of the conjugated diene in the copolymer rubber.

Examples of commercially available silane coupling agents include vinyltrimethoxysilane; 3-methacryloxypropyltrimethoxysilane; vinylbenzyl cationic silane; 3-aminopropyltriethoxysilane; N-(2-aminoethyl)-3-aminopropyltrimethoxysilane; 3-glycidoxypropyltrimethoxysilane; bis(3-triethoxysilylpropyl)-tetrasulfide; 3-mercaptopropyltrimethoxysilane; and 3-chloropropyltrimethoxysilane.

Various additives may be incorporated into the copolymer rubber compositions described herein, such as stability control agents, nucleating agents, pigments, antioxidants, acid scavengers, ultraviolet absorbers, flame retardants, processing aids, cross-linking promoters, reinforcing particles and processing aids, curing accelerators, and the like. The combined amount of these additives should be less than about 15 parts by weight per 100 parts of copolymer rubber.

In accordance with a preferred embodiment of manufacturing the coupling agent embodiment of the rubber compositions described herein, the coupling agent is mixed with the silica particles before incorporating the silica particles into the uncured copolymer rubber. In this manner, the silica filler particles are strongly bonded to the rubber via the coupling agent and provide much better mechanical properties to the composition.

In accordance with another embodiment of manufacturing the coupling agent embodiment of the rubber compositions described herein, the coupling agent is coated onto the silica particles before incorporating the silica particles into the uncured copolymer rubber. In this manner, the silica filler particles are strongly bonded to the rubber via the coupling agent and provide much better mechanical properties to the composition. When coated onto the filler particles prior to adding the coated filler to the rubber composition, the coupling agent (active) is preferably added in an amount of about 0.1% by weight to about 15% by weight, preferably about 0.4% by weight to about 10% by weight, based on the weight of the filler particles being coated.

In accordance with another embodiment of the rubber compositions, and articles prepared therefrom, the rubber material is reinforced with a fabric, preferably a woven fabric, such as nylon, e.g., Nylon 6,6; a polyester, a polyaramide, cotton or silk. In a preferred embodiment, the fabric is sandwiched between two layers of uncured rubber sheets, each having a thickness of, e.g., 0.040 to 0.050 inch. This composite sandwich can be calendared to achieve maximum density and predetermined thickness or it can be compression molded directly. With either case, the uncured sandwich is usually die cut into a perform to be placed in an open compression mold where male and female mold halves are each precisely machined to the final convolution shape and size, closed upon the preform and heated to activate the cure package in the rubber formulation to achieve cross-linking or vulcanization of the composite diaphragm. The fabric/rubber composite material is usually trimmed into a desired outside diameter, including bolt holes in the flange area, to produce the final part such as the spring-biased actuator diaphragm shown in FIG. 1. Suitable molding conditions are die temperatures of about 130° C. to 200° C., vulcanizing time of about 3 to 30 minutes, and a molding pressure of about 50 to about 150 kilograms/cm$^2$.

An example of a spring-biased actuator valve 10, for controlling fluid flow in a fluid conduit 12 is shown in FIG. 1. The spring-biased actuator valve 10 generally includes an actuator housing 14 containing an actuator diaphragm 16 that is spring-biased via springs 18 and contact plate 20 in a downward (valve closed) position. The diaphragm is operatively interconnected, via structure, to valve stem 21 and value plug 22 to seal the valve plug 22 against valve seat 24 until supplied pneumatic pressure against diaphragm 16 compresses the springs 18 to raise the valve plug 22, via valve stem 21, to open the valve and allow for fluid flow through the fluid conduit 12.

EXAMPLES

Spring biased actuator diaphragms were formed from acrylonitrile/1,3-butadiene copolymer rubber (PERBUNAN® 2845 C) having a weight ratio of acrylonitrile to 1,3-butadiene of about 28 to about 72; 10% by weight PLASTHALL® 226, 40% by weight fumed silica (ULTRASIL® VN-3 SP); 60% by weight carbon black; and 1.5% by weight sulfur vulcanizing agent (all weights based on the weight of copolymer rubber), surrounding a centrally disposed woven nylon 6,6 fabric, having a thickness of about 16 threads per centimeter (40 threads per inch) in each direction, a Mullen burst strength of about 1.4 Mpa (700 psi), a weight of 120 gms/m$^2$ to 131 gms/m$^2$ (4.65 to 5.05 oz./yd$^2$), and a thickness of 0.25 mm to 0.30 mm (0.010 to 0.012 inch). The total thickness of the diaphragm (nylon fabric and two, surrounding layers of rubber composition) was 2.1 mm±0.4 mm (0.084 inch±0.015 inch). The following data (Tables I and II) were obtained on diaphragm samples formed from the most preferred rubber composition shown in the following table:

| COMPONENT | FUNCTION | MOST PREFERRED[1] | PREFERRED RANGE[1] | RANGE[1] |
|---|---|---|---|---|
| Perbunan 2845C | copolymer rubber | 100.00 | 100.00 | 100.00 |
| N-550 Black | carbon black filler | 60.00 | 40-80 | 0-80 |
| Ultrasil VN3 SP | precipitated silica filler | 40.00 | 20-60 | 0-60 |
| Plasthall 226[2] | plasticizer | 10.00 | 1-20 | 1-30 |
| Sruktol WB-300 | fatty acid ester plasticizer | 2.50 | 1-30 | 0-30 |
| Kadox 920 C | zinc oxide (325 mesh) | 4.00 | 1-8 | 0-10 |
| Flexzone 3C[3] | $C_{15}H_{18}N_2$ | 2.00 | 1-5 | 0-10 |
| Agerite Resin D | oxidation and heat degradation retarder | 1.00 | 0.1-3 | 0-10 |
| Stearic Acid R.G. | rubber compounding acid | 0.50 | 0.1-2 | 0-5 |
| Santogard PVI[4] | prevents premature vulcanization | 0.50 | 0.1-2 | 0-5 |
| Sunproof Junior | paraffin wax (anti-ozonate) | 1.00 | 0.1-3 | 0-10 |
| DSC-18 | mercaptosilane coupling agent (15% active) | 2.78 | 0.5-6 | 0.1-20 |
| Methyl Tauds[5] | curing accelerator | 1.50 | 0.5-3 | 0-10 |
| Vanax NS | curing accelerator | 2.00 | 0.5-5 | 0-10 |
| Vanax A | curing accelerator | 1.50 | 0.5-3 | 0-10 |
| Rhenogran S-80 | sulfur (80% active vulcanizing agent) | 1.50 | 0.5-5 | 0.1-10 |
| TOTAL: |  | 230.78 |  |  |

[1]Parts per hundred parts of copolymer rubber
[2]dibutoxyethoxyethyl adipate
[3]N-isopropyl-N-phenyl-p-phenylenediamine (antioxidant)
[4]N-cyclohexy thiophthalimide
[5]tetramethylthiuram disulfide Mixing Protocol
Banbury MB:
Add copolymer rubber & break for 1 minute.
Blend DSC-18 with Ultrasil VN3 and immediately add to the mixer.
Mix Stearic Acid, Kadox 920 C & Santogard PVI with ½ N-550 Black and add to mixer.
Sweep, mix Plasthall 226 with remaining N-550 Black and add to mixer.

Sweep and add Agerite Resin D, Struktol WB-300, Sunproof Junior and Flexzone 3C.
Drop or when Temp reaches 150° C. Add Rhenorgran S-80 on mill immediately after banding batch.
Blend for 3 minutes and sheet off. Bin age 24 hours before accelerating.
Mill Acceleration:
Band MB
Add Methyl Tuads, Vanax A separately—DO NOT MIX CHEMICALS TOGETHER.
Sheet Off.

TABLE I

% Compression Set Tests

Summary

| Temp (° F.) | % Comp Set |
|---|---|
| 73 | 14.7 |
| 158 | 23.1 |
| 212 | 46.6 |
| 302 | 71.9 |

ASTM D 395 Method A (73° F.)

| Sample | Thick. Inches | Compress Set % | Spring Compress Inches | ** Time ** hr | mn | Recovery Time hours |
|---|---|---|---|---|---|---|
| A | 0.511 | NA | 1 1/64 | 8 | 48 | |
| | 0.491 | 3.9 | | 8 | 48 | 0.0 |
| | 0.497 | 2.7 | | 9 | 18 | 0.5 |
| | 0.499 | 2.3 | | 9 | 3 | 24 |
| B | 0.520 | NA | 63/64 | 8 | 48 | |
| | 0.500 | 3.8 | | 8 | 48 | 0.0 |
| | 0.506 | 2.7 | | 9 | 18 | 0.5 |
| | 0.508 | 2.3 | | 9 | 3 | 24 |
| Average | | 2.7 | | | | |

ASTM D 395 Method B (73° F.)

| Sample | Thick. Inches | ASTM % Compression Set | * Time ** hr | mn | Recovery Time hours |
|---|---|---|---|---|---|
| A | 0.522 | | 8 | 49 | |
| | 0.494 | 19.0 | 9 | 21 | 0.0 |
| | 0.499 | 15.6 | 9 | 51 | 0.5 |
| | 0.503 | 12.9 | 12 | 0 | 24 |
| B | 0.520 | | 8 | 49 | |
| | 0.493 | 18.6 | 9 | 21 | 0.0 |
| | 0.500 | 13.8 | 9 | 51 | 0.5 |
| | 0.501 | 13.1 | 12 | 0 | 24 |
| Average | | 14.7 | | | |

Temp = 158° F.

| Sample Number | Thick. Inches | ASTM % Compression Set | * Time ** hr | mn | Recovery Time hours |
|---|---|---|---|---|---|
| C | 0.526 | | 9 | 22 | |
| | 0.490 | 23.8 | 9 | 22 | 0.0 |
| | 0.490 | 23.8 | 9 | 52 | 0.5 |
| | 0.492 | 22.5 | 9 | 22 | 24.0 |
| D | 0.522 | | 9 | 22 | |
| | 0.488 | 23.1 | 9 | 22 | 0.0 |
| | 0.489 | 22.4 | 9 | 52 | 0.5 |
| | 0.490 | 21.8 | 9 | 22 | 24.0 |
| Average | | 23.1 | | | |

TABLE I-continued

ASTM D 395 Method B Temp = 212° F.

| Sample | Thick. Inches | ASTM % Compression Set | ** Time ** hr | mn | Recovery Time hours |
|---|---|---|---|---|---|
| E | 0.524 | | 9 | 5 | |
| | 0.454 | 47.0 | 9 | 5 | 0.0 |
| | 0.455 | 46.3 | 9 | 35 | 0.5 |
| | 0.462 | 41.6 | 9 | 16 | 24 |
| F | 0.516 | | 9 | 5 | |
| | 0.449 | 47.5 | 9 | 5 | 0.0 |
| | 0.450 | 46.8 | 9 | 35 | 0.5 |
| | 0.455 | 43.3 | 9 | 16 | 24 |
| Average | | 46.6 | | | |

ASTM D 395 Method B Temp = 302° F.

| Sample | Dia. Inches | Thick. Inches | ASTM % Compression Set | ** Time ** hr | mn | Recovery Time hours |
|---|---|---|---|---|---|---|
| G | | 0.512 | | 15 | 50 | |
| | | 0.416 | 70.1 | 15 | 40 | 0.0 |
| | | 0.414 | 71.5 | 16 | 10 | 0.5 |
| | | 0.415 | 70.8 | 15 | 40 | 24 |
| H | | 0.523 | | 15 | 50 | |
| | | 0.419 | 70.3 | 15 | 40 | 0.0 |
| | | 0.416 | 72.3 | 16 | 10 | 0.5 |
| | | 0.417 | 71.6 | 15 | 40 | 24 |
| Average | | | 71.9 | | | |

DYNAMIC MECHANICAL ANALYSIS COLD TESTS

| | | |
|---|---|---|
| Storage Onset: | −X + −5° C. | −X + −5° F. |
| Loss Peak: | −X + −5° C. | −X + −5° F. |
| Tan Peak: | −X + −5° C. | −X + −5° F. |

After Calibration

| Sample # | Storage Modulus Onset ° C. | Loss Modulus Peak ° C. | Tan Delta Peak ° C. |
|---|---|---|---|
| 1 | −32.232 | −29.484 | −26.042 |
| 2 | −35.309 | −29.656 | −25.814 |
| 3 | −30.496 | −28.229 | −23.936 |
| Average | −32.679 | −29.123 | −25.264 |

100° C., 168 HOUR HEAT AGING TESTS

| Sample No. | Thick In. | Width In. | Area In. Sq. | Tensile Strength. psi | Elong. % | Tensile Modulus 100% | |
|---|---|---|---|---|---|---|---|
| 1 | 0.083 | 0.250 | 0.0208 | 2987 | 170 | 1846 | |
| | 0.085 | 0.250 | 0.0213 | 3191 | 181 | 1875 | |
| | 0.085 | 0.250 | 0.0213 | 2860 | 197 | 1456 | |
| | 0.087 | 0.250 | 0.0218 | 2894 | 186 | 1542 | |
| | | | | 2983 | 183.5 | 1680 | Average |

After Aging

| 2 | 0.086 | 0.250 | 0.0215 | 3032 | 126 | 2466 | |
|---|---|---|---|---|---|---|---|
| | 0.085 | 0.250 | 0.0213 | 2920 | 112 | 2665 | |
| | 0.085 | 0.250 | 0.0213 | 2751 | 120 | 2350 | |
| | 0.085 | 0.250 | 0.0213 | 2674 | 112 | 2443 | |
| | | | | 2844 | 117.5 | 2481 | Average |
| % Change | | | | −4.6 | −36 | 48 | |

TABLE II

HYDROCARBON RESISTANCE TESTS

| Sample Number | Period | soak? dry? | Time hrs | Thick. in. | Duro. Hard. | Hard. % Change | Resilience Bashore | Resilience % Change | Linear % Swell | Vol. % Swell | ** Time ** hr | mn |
|---|---|---|---|---|---|---|---|---|---|---|---|---|
| \multicolumn{13}{c}{hydrocarbon:hexane (75° F.)} |
| 1 | Initial | — | — | 0.259 | 88 | — | 16 | — | — | — | 8 | 30 |
|   | 1 | soak | 25.3 | 0.265 | 80 | −8 | 41 | 25 | 2.3 | 7.1 | 9 | 50 |
|   | 2 | soak | 97.3 | 0.262 | 81 | −7 | 37 | 21 | 1.2 | 3.5 | 9 | 50 |
|   | 3 | dry | 95.2 | 0.254 | 88 | 0 | 21 | 5 | −1.9 | −5.7 | 9 | 0 |
|   | 4 | dry | 240.2 | 0.252 | 89 | 1 | 21 | 5 | −2.7 | −7.9 | 10 | 0 |
| 2 | Initial | — | — | 0.271 | 88 | — | 18 | — | — | — | 8 | 30 |
|   | 1 | soak | 25.3 | 0.278 | 80 | −8 | 42 | 24 | 2.6 | 8.0 | 9 | 50 |
|   | 2 | soak | 97.3 | 0.276 | 81 | −7 | 39 | 21 | 1.8 | 5.6 | 9 | 50 |
|   | 3 | dry | 95.2 | 0.268 | 88 | 0 | 22 | 4 | −1.1 | −3.3 | 9 | 0 |
|   | 4 | dry | 240.2 | 0.267 | 90 | 2 | 20 | 2 | −1.5 | −4.4 | 10 | 0 |
| 3 | Initial | — | — | 0.251 | 89 | — | 18 | — | — | — | 8 | 30 |
|   | 1 | soak | 25.3 | 0.258 | 80 | −9 | 41 | 23 | 2.8 | 8.6 | 9 | 50 |
|   | 2 | soak | 97.3 | 0.256 | 81 | −8 | 38 | 20 | 2.0 | 6.1 | 9 | 50 |
|   | 3 | dry | 95.2 | 0.249 | 89 | 0 | 21 | 3 | −0.8 | −2.4 | 9 | 0 |
|   | 4 | dry | 240.2 | 0.247 | 89 | 0 | 21 | 3 | −1.6 | −4.7 | 10 | 0 |
| \multicolumn{13}{c}{hydrocarbon:SAE 20 oil (75° F.)} |
| 1 | Initial | — | — | 0.254 | 87 | — | 21 | — | — | — | 13 | 0 |
|   | 1 | soak | 24.0 | 0.253 | 87 | 0 | 24 | 3 | −0.4 | −1.2 | 13 | 0 |
|   | 2 | soak | 96.0 | 0.254 | 86 | −1 | 23 | 2 | 0.0 | 0.0 | 13 | 0 |
|   | 3 | dry | 240.0 | 0.254 | 87 | 0 | 22 | 1 | 0.0 | 0.0 | 13 | 0 |
| 2 | Initial | — | — | 0.260 | 87 | — | 21 | — | — | — | 13 | 0 |
|   | 1 | soak | 24.0 | 0.260 | 87 | 0 | 24 | 3 | 0.0 | 0.0 | 13 | 0 |
|   | 2 | soak | 96.0 | 0.259 | 86 | −1 | 23 | 2 | −0.4 | −1.1 | 13 | 0 |
|   | 3 | dry | 240.0 | 0.259 | 87 | 0 | 22 | 1 | −0.4 | −1.1 | 13 | 0 |
| 3 | Initial | — | — | 0.260 | 87 | — | 21 | — | — | — | 13 | 0 |
|   | 1 | soak | 24.0 | 0.263 | 87 | 0 | 24 | 3 | 1.2 | 3.5 | 13 | 0 |
|   | 2 | soak | 96.0 | 0.262 | 86 | −1 | 23 | 2 | 0.8 | 2.3 | 13 | 0 |
|   | 3 | dry | 240.0 | 0.258 | 87 | 0 | 22 | 1 | −0.8 | −2.3 | 13 | 0 |
| \multicolumn{13}{c}{hydrocarbon:propane (75° F.)} |
| 1 | Initial | — | — | 0.262 | 87 | — | 19 | — | — | — | 9 | 45 |
|   | 1 | soak | 121.5 | 0.266 | 83 | −4 | 37 | 18 | 1.5 | 4.7 | 11 | 15 |
|   | 2 | dry | 70.7 | 0.258 | 89 | 2 | 20 | 1 | −1.5 | −4.5 | 9 | 55 |
|   | 3 | dry | 238.5 | 0.262 | 88 | 1 | 18 | −1 | 0.0 | 0.0 | 9 | 42 |
| 2 | Initial | — | — | 0.265 | 87 | — | 20 | — | — | — | 9 | 45 |
|   | 1 | soak | 121.5 | 0.264 | 83 | −4 | 36 | 16 | −0.4 | −1.1 | 11 | 15 |
|   | 2 | dry | 70.7 | 0.256 | 89 | 2 | 20 | 0 | −3.4 | −9.8 | 9 | 55 |
|   | 3 | dry | 238.5 | 0.256 | 89 | 2 | 18 | −2 | −3.4 | −9.8 | 9 | 42 |
| 3 | Initial | — | — | 0.259 | 88 | — | 20 | — | — | — | 9 | 45 |
|   | 1 | soak | 121.5 | 0.261 | 84 | −4 | 36 | 16 | 0.8 | 2.3 | 11 | 15 |
|   | 2 | dry | 70.7 | 0.255 | 89 | 1 | 20 | 0 | −1.5 | −4.6 | 9 | 55 |
|   | 3 |  | 238.5 | 0.254 | 90 | 2 | 18 | −2 | −1.9 | −5.7 | 9 | 42 |
| \multicolumn{13}{c}{anhydrous ammonia (75° F.)} |
| 1 | Initial | — | — | 0.266 | 88 | — | 20 | — | — | — | 16 | 0 |
|   | 1 | soak | 120.0 | 0.273 | 82 | −6 | 41 | 21 | 2.6 | 8.1 | 16 | 0 |
|   | 2 | dry | 89.6 | 0.269 | 94 | 6 | 20 | 0 | 1.1 | 3.4 | 9 | 35 |
|   | 3 | dry | 232.9 | 0.27 | 94 | 6 | 20 | 0 | 1.5 | 4.6 | 8 | 55 |
| 2 | Initial | — | — | 0.246 | 88 | — | 20 | — | — | — | 16 | 0 |
|   | 1 | soak | 120.0 | 0.251 | 82 | −6 | 39 | 19 | 2.0 | 6.2 | 16 | 0 |
|   | 2 | dry | 89.6 | 0.241 | 94 | 6 | 20 | 0 | −2.0 | −6.0 | 9 | 35 |
|   | 3 | dry | 232.9 | 0.24 | 94 | 6 | 20 | 0 | −2.4 | −7.1 | 8 | 55 |
| 3 | Initial | — | — | 0.281 | 88 | — | 21 | — | — | — | 16 | 0 |
|   | 1 | soak | 120.0 | 0.284 | 84 | −4 | 41 | 20 | 1.1 | 3.2 | 16 | 0 |
|   | 2 | dry | 89.6 | 0.271 | 94 | 6 | 20 | −1 | −3.6 | −10.3 | 9 | 35 |
|   | 3 | dry | 232.9 | 0.273 | 94 | 6 | 20 | −1 | −2.8 | −8.3 | 8 | 55 |

The invention claimed is:

1. An actuator housing that includes upper and lower flanges cooperatively arranged to form the housing, each flange being coated with a resin-containing coating composition; and
a diaphragm compressively retained between the upper and lower flanges to form at least one pressure chamber within the housing, the diaphragm formed from a rubber composition which comprises at least a copolymer rubber and a plasticizer having sufficient solubility in said resin-containing coating composition such that the diaphragm, held under sufficient compression between the flanges, produces a bond between the rubber composition and the resin-containing coating on the flanges to provide increased retention of the diaphragm between the flanges, wherein the plasticizer contained in the copolymer rubber is soluble in the resin of the coating composition in an amount of at least 0.1 gram plasticizer per 100 grams of coating composition resin.

2. The actuator housing in accordance with claim 1, wherein the diaphragm comprises a fabric-reinforced rubber article formed by sandwiching a fabric layer, in woven or non-woven form, between two sheets of the rubber composition, followed by compressing the rubber sheets together at a temperature sufficient to vulcanize said rubber sheets together surrounding the fabric layer.

3. The actuator housing in accordance with claim 2, wherein the fabric layer is a woven fabric.

4. The actuator housing in accordance with claim 3, wherein the woven fabric is selected from the group consisting of nylon, polyaramide, polyester, silk, cotton and a combination thereof.

5. The actuator housing in accordance with claim 4, wherein the fabric is woven from nylon 6,6.

6. An actuator housing in accordance with claim 1, wherein the resin-containing coating composition comprises a polymer or copolymer selected from the group consisting of a polyester, polyether, polyacrylic, polyurethane, latex, alkyd, epoxy, and a combination thereof.

7. A housing in accordance with claim 6, wherein the resin-containing coating composition is selected from the group consisting of a polyurethane, polyethylene terephthalate, polybutylene terephthalate, an alkyd resin, and an epoxy resin.

8. A housing in accordance with claim 1 wherein the plasticizer contained in the copolymer rubber is soluble in the resin of the coating composition in an amount of at least 0.5 gram plasticizer per 100 grams of coating composition resin.

9. A housing in accordance with claim 8 wherein the plasticizer contained in the copolymer rubber is soluble in the resin of the coating composition in an amount of 1-5 grams plasticizer per 100 grams of coating composition resin.

10. The housing of claim 8, wherein the plasticizer is included in the copolymer rubber in an amount in the range of about 1 to about 30 parts by weight per 100 parts by weight.

11. The housing of claim 10, wherein the plasticizer is included in the copolymer rubber in an amount in the range of about 3 to about 20 parts by weight per 100 parts by weight.

12. The housing of claim 10, wherein the plasticizer comprises mineral oil.

13. The housing of claim 10, wherein the plasticizer comprises an epoxidized plasticizer.

14. The housing of claim 13, wherein the epoxidized plasticizer is selected from the group consisting of epoxidized soy bean oil and an epoxidized alkyl alcohol-fatty acid ester.

15. The housing of claim 1, wherein the plasticizer comprises a fatty acid ester.

16. The actuator housing of claim 2 wherein the plasticizer contained in the copolymer rubber is soluble in the resin of the coating composition in an amount of at least 0.5 gram plasticizer per 100 grams of coating composition resin.

17. The actuator housing of claim 2 wherein the plasticizer contained in the copolymer rubber is soluble in the resin of the coating composition in an amount of 1-5 grams plasticizer per 100 grams of coating composition resin.

18. The actuator housing of claim 1, wherein the plasticizer is included in the copolymer rubber in an amount in the range of about 1 to about 30 parts by weight per 100 parts by weight.

19. The housing of claim 18, wherein the plasticizer is included in the copolymer rubber in an amount in the range of about 3 to about 20 parts by weight per 100 parts by weight.

20. The actuator housing of claim 6, wherein the plasticizer comprises mineral oil.

21. The actuator housing of claim 6, wherein the plasticizer comprises an epoxidized plasticizer.

22. The actuator housing of claim 21, wherein the epoxidized plasticizer is selected from the group consisting of epoxidized soy bean oil and an epoxidized alkyl alcohol-fatty acid ester.

23. The actuator housing of claim 6, wherein the plasticizer comprises a fatty acid ester.

* * * * *